(12) United States Patent
Ye et al.

(10) Patent No.: US 10,136,459 B2
(45) Date of Patent: Nov. 20, 2018

(54) METHOD, DEVICE, AND SYSTEM FOR ESTABLISHING WIRELESS NETWORK CONNECTION

(71) Applicant: Xiaomi Inc., Beijing (CN)

(72) Inventors: Hualin Ye, Beijing (CN); Xin Liu, Beijing (CN); Yongfeng Xia, Beijing (CN)

(73) Assignee: Xiaomi Inc., Beijing (CN)

( * ) Notice: Subject to any disclaimer, the term of this patent is extended or adjusted under 35 U.S.C. 154(b) by 175 days.

(21) Appl. No.: 15/172,708

(22) Filed: Jun. 3, 2016

(65) Prior Publication Data

US 2017/0127459 A1    May 4, 2017

(30) Foreign Application Priority Data

Oct. 30, 2015    (CN) .......................... 2015 1 0729467

(51) Int. Cl.
| | |
|---|---|
| *H04W 76/11* | (2018.01) |
| *B64C 39/02* | (2006.01) |
| *H04W 12/04* | (2009.01) |
| *H04B 7/185* | (2006.01) |
| *H04W 12/06* | (2009.01) |

(Continued)

(52) U.S. Cl.
CPC ........... *H04W 76/11* (2018.02); *B64C 39/024* (2013.01); *H04B 7/15507* (2013.01); *H04B 7/18504* (2013.01); *H04W 12/04* (2013.01); *H04W 12/06* (2013.01); *B64C 2201/127* (2013.01); *B64C 2201/146* (2013.01); *H04W 84/12* (2013.01)

(58) Field of Classification Search
None
See application file for complete search history.

(56) References Cited

U.S. PATENT DOCUMENTS

| | | |
|---|---|---|
| 8,756,439 B1 | 6/2014 | Jannson et al. |
| 2006/0251256 A1 | 11/2006 | Asokan et al. |
| 2013/0173811 A1 | 7/2013 | Ha et al. |

(Continued)

FOREIGN PATENT DOCUMENTS

| | | |
|---|---|---|
| CN | 103987033 A | 8/2014 |
| CN | 104238469 A | 12/2014 |

(Continued)

OTHER PUBLICATIONS

International Search Report of PCT/CN2015/098690, mailed from the State Intellectual Property Office of China dated Jul. 22, 2016.

(Continued)

*Primary Examiner* — Christine T Duong
(74) *Attorney, Agent, or Firm* — Finnegan, Henderson, Farabow, Garrett & Dunner LLP

(57) ABSTRACT

A mobile terminal for establishing a wireless network connection is disclosed. The mobile terminal may comprise a processor and a memory for storing instructions executable by the processor. The processor may be configured to acquire a network configuration parameter of a repeater and send the network configuration parameter to target equipment through a first communication link established between the mobile terminal and the target equipment. The target equipment may establish a first wireless network connection with the repeater by using the network configuration parameter.

7 Claims, 16 Drawing Sheets

(51) Int. Cl.
*H04B 7/155* (2006.01)
*H04W 84/12* (2009.01)

(56) References Cited

U.S. PATENT DOCUMENTS

| | | | | |
|---|---|---|---|---|
| 2013/0227336 A1* | 8/2013 | Agarwal | ............. | H04L 43/0811 714/4.3 |
| 2015/0148988 A1 | 5/2015 | Fleck | | |
| 2015/0327265 A1* | 11/2015 | Lee | ................... | H04W 72/0446 370/311 |
| 2016/0227518 A1* | 8/2016 | Li | ........................ | H04W 72/042 |
| 2016/0362173 A1* | 12/2016 | Marion | ................. | B64C 39/024 |

FOREIGN PATENT DOCUMENTS

| | | |
|---|---|---|
| CN | 104238561 A | 12/2014 |
| CN | 104808675 A | 7/2015 |
| CN | 204536910 U | 8/2015 |
| JP | 2008-4975 A | 1/2008 |
| JP | 2008537381 A | 9/2008 |
| KR | 10-2013-0080487 A | 7/2013 |
| KR | 10-2014-0032262 A | 3/2014 |
| KR | 10-2015-0052522 A | 5/2015 |
| KR | 10-1530581 B1 | 6/2015 |
| RU | 2202152 C2 | 4/2003 |
| WO | WO 96/39788 A1 | 12/1996 |
| WO | WO 2012/130790 A2 | 10/2012 |
| WO | WO 2013/130778 A1 | 9/2013 |

OTHER PUBLICATIONS

English version of International Search Report of PCT/CN2015/098690, mailed from the State Intellectual Property Office of China dated Jul. 22, 2016.

Notice of Allowance for Korean Patent Application No. 10-2016-7004653, mailed from Korean Intellectual Property Office, dated Apr. 28, 2017.

DJI.com et al., "Phantom 2 Vision + User Manual V1.6," dated Apr. 30, 2014, retrieved from http://download.dji-innovations.com/downloads/phantom_2_vision_plus/en/Phantom_2_Vision_Plus_User Manual_v1.6_en.pdf.

Extended European Search Report issued in European Application No. 16175735.6, mailed from the European Patent Office, dated Mar. 8, 2017.

Office Action and Search Report issued in Russian Patent Application No. 2016114810/07(023300), mailed from the Patent Office of the Russian Federation, dated Feb. 27, 2017.

DJI Phantom 2 Vision+, User Manual v1.6, dated Nov. 2014.

\* cited by examiner

METHOD, DEVICE, AND SYSTEM FOR ESTABLISHING WIRELESS NETWORK CONNECTION

CROSS-REFERENCE TO RELATED APPLICATIONS

The present application is based upon and claims priority to Chinese Patent Application No. 201510729467.4, filed Oct. 30, 2015, the entire contents of which are incorporated herein by reference.

TECHNICAL FIELD

The present disclosure generally relates to the field of communication technology, and more particularly, to a method, a device, and a system for establishing a wireless network connection.

BACKGROUND

A consumer grade unmanned aerial vehicle, such as a drone, is easy to operate, and can be used for entertainment.

Some drones can transmit pictures and videos captured in real time during a flight to a smartphone. A wireless network connection can be established between the drone and the smartphone by Wi-Fi (Wireless-Fidelity) technology, and the drone can transmit collected image signals back to the smartphone through the wireless network connection. In order to extend the communication distance between the drone and the smartphone, a repeater can be used to forward data between the drone and the smartphone. The repeater may serve as a wireless AP (Access Point), and the drone and the smartphone can be respectively connected with the repeater. The drone can send the image signals to the repeater, and the repeater forwards the image signals to the smartphone. In order to improve data security, the repeater has access authentication messages such as a SSID (Service Set Identifier), a password, and the like. The drone needs to provide the access authentication messages to the repeater before establishing a wireless network connection with the repeater, and the connection may be successfully established only when the authentication is passed.

SUMMARY

One aspect of the present disclosure is directed to a mobile terminal for establishing a wireless network connection. The mobile terminal may comprise a processor and a memory for storing instructions executable by the processor. The processor may be configured to acquire a network configuration parameter of a repeater and send the network configuration parameter to target equipment through a first communication link established between the mobile terminal and the target equipment. The target equipment may establish a first wireless network connection with the repeater by using the network configuration parameter.

Another aspect of the present disclosure is directed to a device for establishing a wireless network connection. The device may comprise a processor and a memory for storing instructions executable by the processor. The processor may be configured to receive a network configuration parameter of a repeater sent by a mobile terminal through a first communication link established between the target equipment and a mobile terminal, and establish a first wireless network connection with the repeater by using the network configuration parameter.

Another aspect of the present disclosure is directed to a device for establishing a wireless network connection. The device may comprise a processor and a memory for storing instructions executable by the processor. The processor may be configured to acquire a connection establishing request sent by target equipment. The connection establishing request may carry a network configuration parameter of the repeater, received from a mobile terminal through a first communication link established between the target equipment and a mobile terminal. The processor may be further configured to detect whether the network configuration parameter is correct, and if the network configuration parameter is correct, establish a first wireless network connection with the target equipment.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
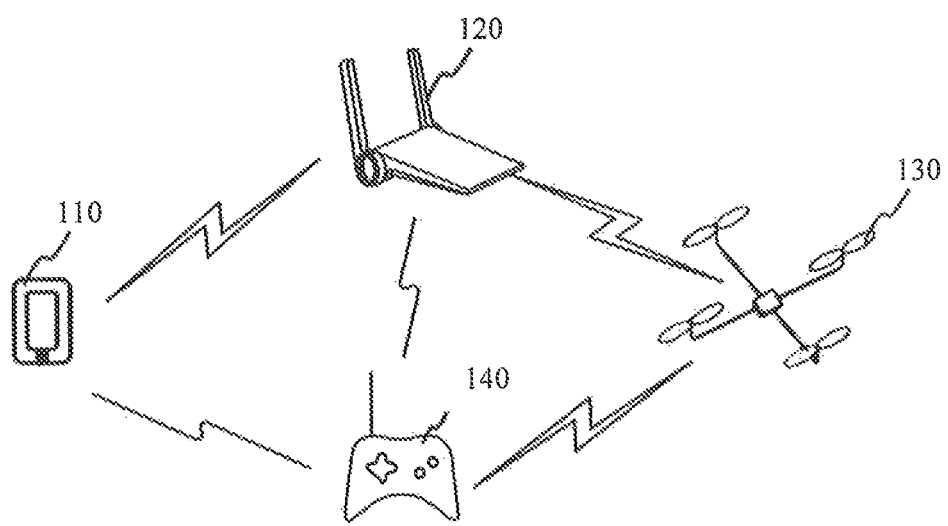
FIG. 1 is a schematic diagram illustrating an implementing environment, according to an exemplary embodiment.

FIG. 1 is a schematic diagram illustrating an implementing environment, according to an exemplary embodiment. The implementing environment includes: a mobile terminal 110, a repeater 120, and target equipment 130.

The mobile terminal 110 may be electronic equipment such as a smartphone, a tablet computer, multimedia playing equipment, and the like. In one embodiment, the mobile terminal 110 is installed with a target client configured to receive and display data transmitted back by the target equipment 130. For example, when the target equipment 130 is an aerial vehicle, such as a drone, equipped with a camera and having an image collecting function, the target client is configured to receive and display the images (photos and/or videos) transmitted back by the target equipment 130.

The repeater 120 may be configured to extend the communication distance between the mobile terminal 110 and the target equipment 130. In one embodiment, the repeater 120 serves as a wireless AP, for the mobile terminal 110 and the target equipment 130 to access. Correspondingly, a first wireless network connection may be established between the target equipment 130 and the repeater 120, and a second wireless network connection may be established between the mobile terminal 110 and the repeater 120. The first wireless network connection and the second wireless network connection may be a Wi-Fi network connection. The first wireless network connection and the second wireless network connection may also be other types of wireless network connection, for example, an LTE (Long Term Evolution) network, a WiMax (Worldwide Interoperability for Microwave Access) network, and the like.

The target equipment 130 may be remote control equipment such as a drone, a remote control car, a remote control ship, and the like. The target equipment 130 may transmit collected data during its operation back to the mobile terminal 110 through the above first wireless network connection and the second wireless network connection. For example, when the target equipment 130 is a drone having an image collecting function, the target equipment 130 collects the images (photos and/or videos) by a camera during a flight, sends collected images to the repeater 120 through the first wireless network connection, and the repeater 120 forwards the above images to the mobile terminal 110 through the second wireless network connection.

For example, as shown in FIG. 1, the implementing environment may further include a remote controller 140.

The remote controller 140 may be configured to remotely control the target equipment 130. For example, the remote controller 140 remotely controls the target equipment 130 via a radio signal. For example, a first communication link may be established between the mobile terminal 110 and the target equipment 130. The first communication link may include a first communication sublink between the mobile terminal 110 and a remote controller 140, and a second communication sublink between the remote controller 140 and the target equipment 130. The mobile terminal 110 may send a network configuration parameter of the repeater 120 to the remote controller 140 through the first communication sublink, such that the remote controller 140 can send the network configuration parameter of the repeater 120 to the target equipment 130 through the second communication sublink. Further, the target equipment 130 can establish the wireless network connection with the repeater 120 by using the network configuration parameter of the repeater 120 after receiving the network configuration parameter.

In one embodiment, the target equipment 130 is a drone. The external equipment of the drone may be connected with a control component of the drone through a data bus. The control component of the drone may be configured to control the operation of the drone. For example, the control component of the drone can establish the second communication sublink with the remote controller 140, receive the radio signal from the remote controller 140, and control the operation, e.g., flight, of the drone. In one embodiment, the control component of the drone can establish the first communication sublink with the mobile terminal 110, and receive the network configuration parameter of the repeater 120 from the mobile terminal 110 through the first communication link. The control component of the drone can provide the network configuration parameter of the repeater 120 to the external equipment of the drone via the data bus, such that the external equipment of the drone establishes the first wireless network connection with the repeater 120 by using the network configuration parameter of the repeater 120. For example, the external equipment of the drone includes an image collecting component and/or a flight parameter detecting component. The image collecting component may include a camera configured to collect the images (photos and/or videos) during the flight of the drone and transmit the collected images back to the mobile terminal 110. The flight parameter detecting component may include sensors configured to detect and collect respective flight parameters, such as speed, height, pressure, and the like, during the flight of the drone and transmit the flight parameters back to the mobile terminal 110.

Furthermore, the repeater 120 may be separate equipment; alternatively, the repeater 120 may be integrated in the remote controller 140.

Figure 2:
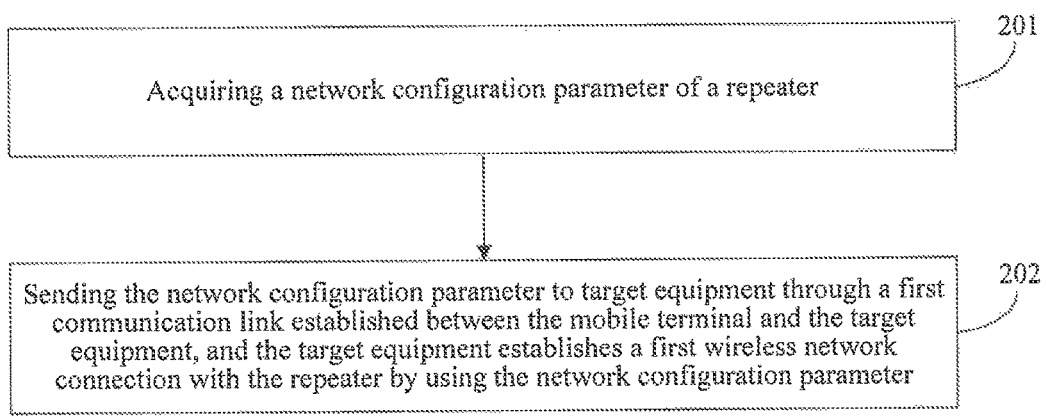
FIG. 2 is a flow chart illustrating a method for establishing a wireless network connection, according to an exemplary embodiment.

FIG. 2 is a flow chart illustrating a method for establishing a wireless network connection, according to an exemplary embodiment. The method may be implemented by the mobile terminal 110 described above with reference to FIG. 1. The method may include the following steps.

In step 201, a network configuration parameter of a repeater is acquired.

In step 202, the network configuration parameter is sent to target equipment through a first communication link established between the mobile terminal and the target equipment, and the target equipment establishes a first wireless network connection with the repeater by using the network configuration parameter.

In some embodiments, the mobile terminal acquires a network configuration parameter of a repeater and then sends the network configuration parameter to target equipment through a first communication link established between the mobile terminal and the target equipment, such that the target equipment establishes a first wireless network connection with the repeater by using the network configuration parameter. As described, providing the network configuration parameter by using the existing first communication link between the mobile terminal and the target equipment can be accomplished without user intervention, simplifying the operation and improving the efficiency.

Figure 3:
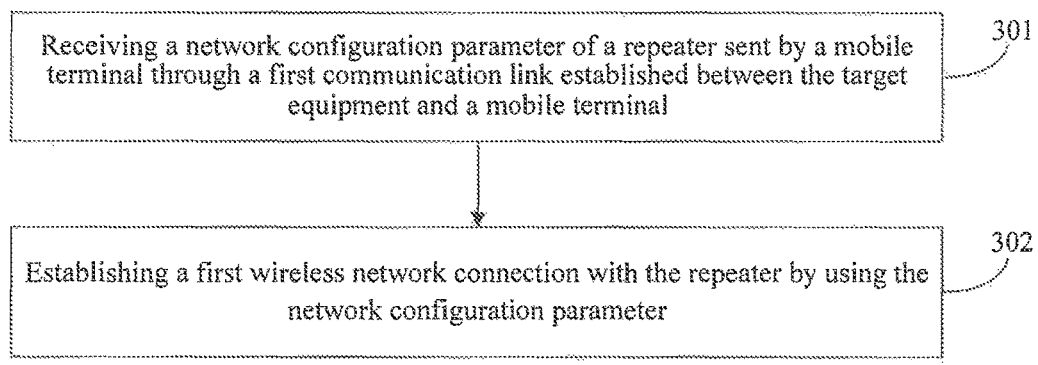
FIG. 3 is a flow chart illustrating a method for establishing a wireless network connection, according to another exemplary embodiment.

FIG. 3 is a flow chart illustrating a method for establishing a wireless network connection, according to another exemplary embodiment. The method may be implemented by the target equipment 130 described above with reference to FIG. 1. The method may include the following several steps.

In step 301, a network configuration parameter of a repeater sent by a mobile terminal is received through a first communication link established between the target equipment and a mobile terminal.

In step 302, a first wireless network connection is established with a repeater by using the network configuration parameter.

In some embodiments, the target equipment receives a network configuration parameter of a repeater sent by a mobile terminal through a first communication link established between the target equipment and a mobile terminal; and then the target equipment establishes a first wireless network connection with the repeater by using the network configuration parameter. As described, providing the network configuration parameter by using the existing first communication link between the mobile terminal and the target equipment can be accomplished without user intervention, simplifying the operation and improving the efficiency.

Figure 4:
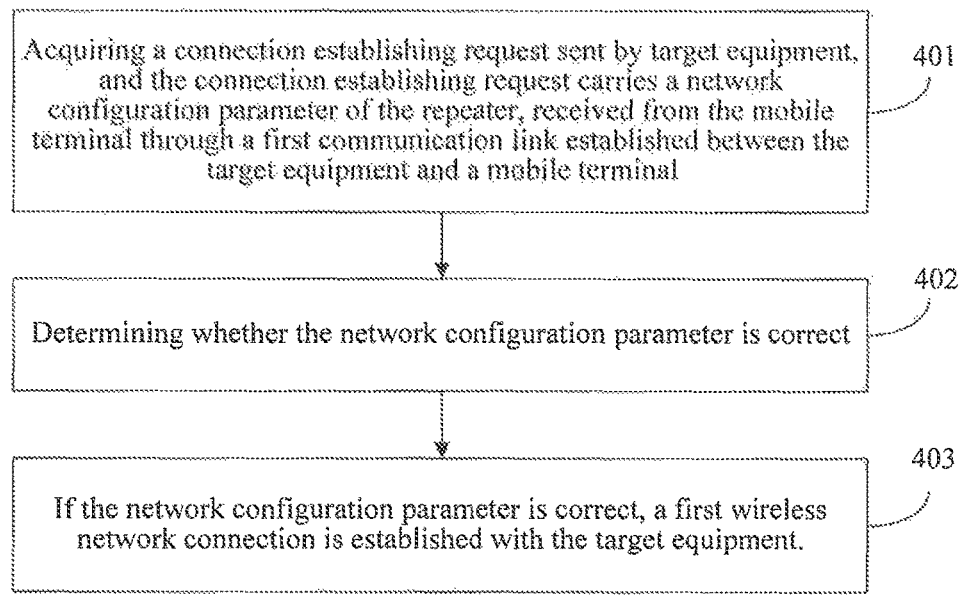
FIG. 4 is a flow chart illustrating a method for establishing a wireless network connection, according to another exemplary embodiment.

FIG. 4 is a flow chart illustrating a method for establishing a wireless network connection, according to another exemplary embodiment. The method may be implemented by the repeater 120 described above with reference to FIG. 1. The method may include the following steps.

In step 401, a connection establishing request sent by target equipment is acquired, and the connection establishing request carries a network configuration parameter of the repeater, received from the mobile terminal through a first communication link established between the target equipment and a mobile terminal.

In step 402, it is determined whether the network configuration parameter is correct.

In step 403, if the network configuration parameter is correct, a first wireless network connection is established with the target equipment.

In some embodiments, the repeater acquires a connection establishing request sent by target equipment, and establishes a first wireless network connection with the target equipment when it is detected that the network configuration parameter carried in the connection establishing request is correct. As described, providing the network configuration parameter by using the existing first communication link between the mobile terminal and the target equipment can be accomplished without user intervention, simplifying the operation and improving the efficiency.

Figure 5:
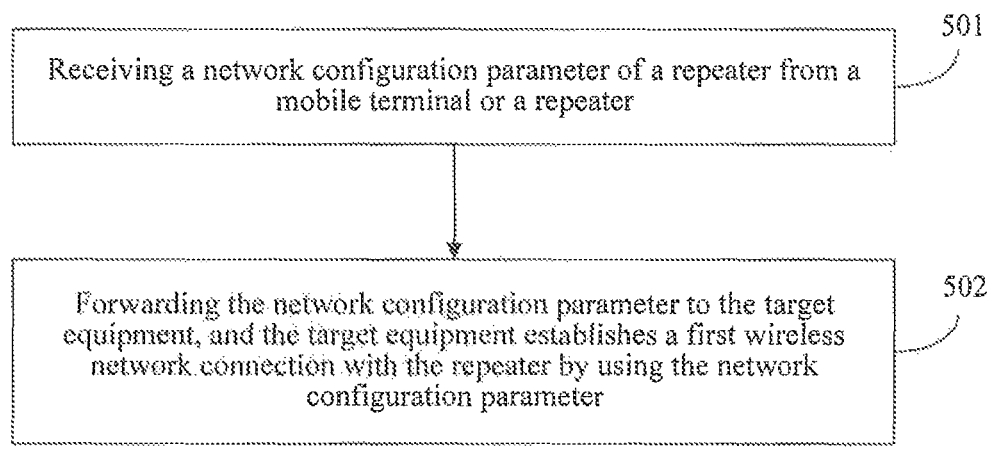
FIG. 5 is a flow chart illustrating a method for establishing a wireless network connection, according to another exemplary embodiment.

FIG. 5 is a flow chart illustrating a method for establishing a wireless network connection, according to another exemplary embodiment. The method may be implemented by the remote controller 140 described above with reference to FIG. 1. The method may include the following steps.

In step 501, a network configuration parameter of a repeater is received from a mobile terminal or a repeater.

In step 502, the network configuration parameter is forwarded to the target equipment, and the target equipment establishes a first wireless network connection with the repeater by using the network configuration parameter.

In some embodiments, the remote controller receives a network configuration parameter from a mobile terminal or a repeater, and forwards the network configuration parameter to the target equipment, such that the target equipment establishes a first wireless network connection with the repeater by using the network configuration parameter. As described, providing the network configuration parameter by using the existing first communication link between the mobile terminal and the target equipment can be accomplished without user intervention, simplifying the operation and improving the efficiency.

Figure 6:
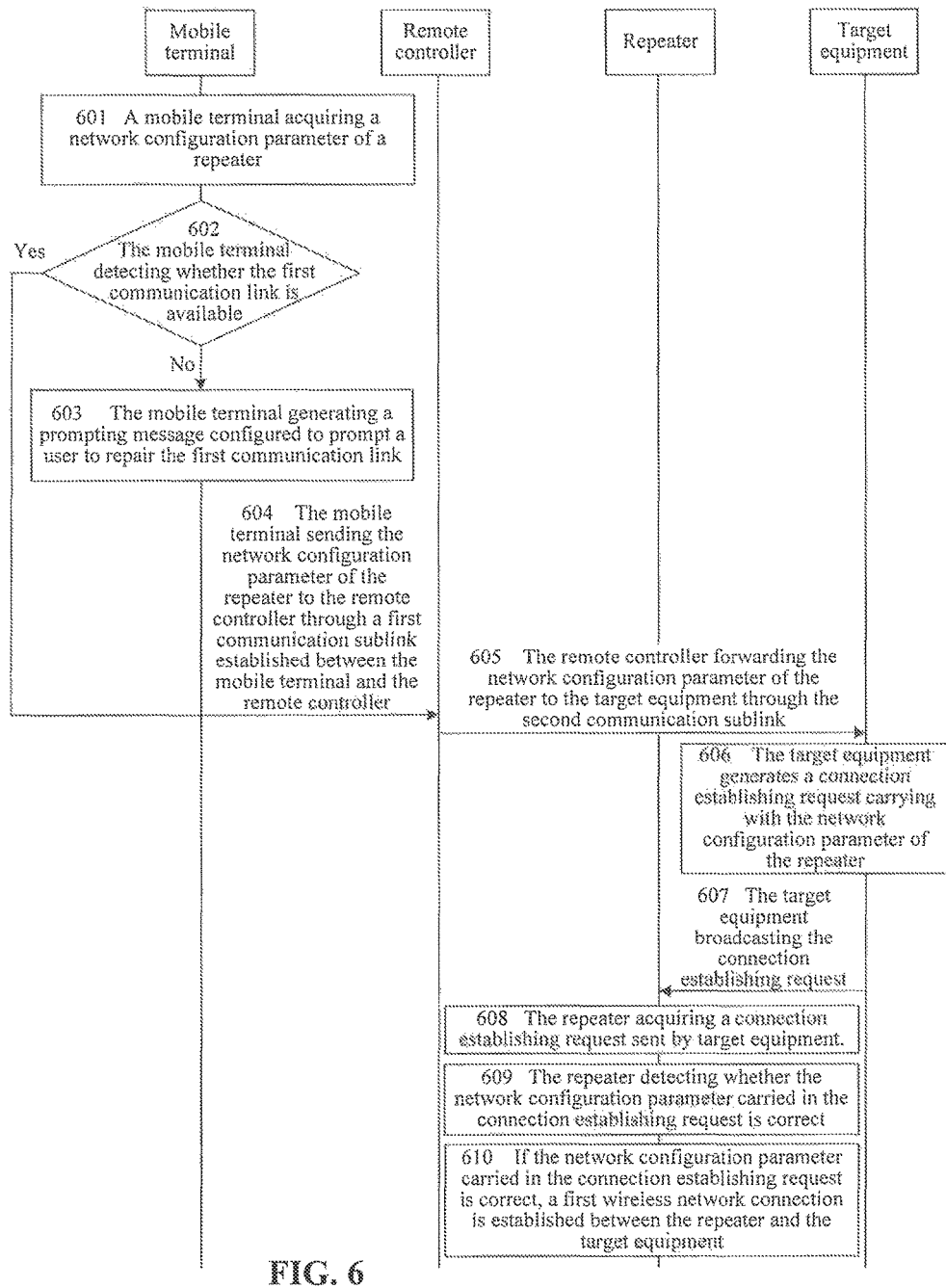
FIG. 6 is a flow chart illustrating a method for establishing a wireless network connection, according to another exemplary embodiment.

FIG. 6 is a flow chart illustrating a method for establishing a wireless network connection, according to another exemplary embodiment. The method may be implemented by devices described above with reference to FIG. 1. The method may include the following several steps.

In step 601, a mobile terminal acquires a network configuration parameter of a repeater.

The network configuration parameter of the repeater may include access authentication messages. The access authentication messages may be for establishing a wireless network connection with the repeater. For example, the access authentication messages may include a SSID and a corresponding password. In some embodiments, the network configuration parameter of the repeater may also include a power configuration parameter of the repeater, a configuration parameter of a communication channel, a configuration parameter of a communication frequency band, and the like.

In one embodiment, the mobile terminal may automatically generate the network configuration parameter of the repeater by a designated application program. For example, the network configuration parameter includes a SSID and a corresponding password, the mobile terminal may randomly generate the SSID and corresponding password by the designated application program. For another example, the mobile terminal may automatically generate the network configuration parameter of the repeater at every predetermined time interval. Every two closest predetermined time intervals may be the same, or may be different. The predetermined time interval may be preset by the designated application program, and may also be set by a user. For example, a predetermined time interval may be set as 12 hours. For another example, the mobile terminal may also automatically generate the network configuration parameter of the repeater every time when detecting that the target equipment starts operation.

Furthermore, in one embodiment, a first communication link can be established between the mobile terminal and the target equipment. In one embodiment, the first communication link may be established by a direct connection. For example, the mobile terminal may directly establish the first communication link with the target equipment by radio, Bluetooth, or infrared ray and the like. In another embodiment, the mobile terminal may establish the first communication link with the target equipment by transit equipment. Combining with the implementing environment as shown in FIG. 1, when the target equipment is remote control equipment such as a drone and the like, it can be equipped with a corresponding remote controller. Therefore, the mobile terminal may establish the first communication link with the target equipment via the remote controller. Correspondingly, the first communication link may include: a first communication sublink between the mobile terminal and a remote controller, and a second communication sublink between the remote controller and the target equipment. The first communication sublink may use a wired connection. For example, the mobile terminal may establish the first communication sublink with the remote controller by a cable configured to transmit data. The cable may be a USB (Universal Serial Bus) data line. Alternatively, the first communication sublink may use a wireless connection. For example, the mobile terminal may establish the second communication sublink with the remote controller by Bluetooth, ZigBee, NFC (Near Field Communication), radio frequency or infrared ray and the like. The second communication sublink between the remote controller and the target equipment may be through the radio. For example, the remote controller sends the data to the target equipment by the radio signal of 2.4 GHz.

In one embodiment, the mobile terminal provides the network configuration parameter of the repeater to the target equipment by using the existing first communication link between the mobile terminal and the target equipment. For example, the mobile terminal performs step 602 before sending the network configuration parameter of the repeater to the target equipment through the first communication link.

In step 602, the mobile terminal detects whether the first communication link is available.

The mobile terminal detects whether the first communication link is available, to ensure that the network configuration parameter of the repeater may be successfully sent to the target equipment subsequently.

If the mobile terminal establishes the first communication link with the target equipment via the remote controller, the mobile terminal may detect whether the first communication sublink and the second communication sublink are available. The mobile terminal may detect whether the first communication sublink is available by the following method: the mobile terminal sends a first testing signal to the remote controller via the first communication sublink; if the mobile terminal receives a response corresponding to the first testing signal fed back by the remote controller, the mobile terminal determines that the first communication sublink is available; otherwise, the mobile terminal determines that the first communication sublink is not available. Furthermore, the mobile terminal may detect whether the second communication sublink is available by the following method: the mobile terminal receives an indicating message from the remote controller via the first communication sublink, the indicating message indicating whether the second communication sublink is available; the remote controller may send a second testing signal to the target equipment by the second communication sublink; if the remote controller receives a response corresponding to the second testing signal fed back by the target equipment, the remote controller determines that the second communication sublink is available, generates and feeds back to the mobile terminal the indicating message indicating that the second communication sublink is available; otherwise, the remote controller determines that the second communication sublink is not available, generates and feeds back to the mobile terminal the indicating message indicating that the second communication sublink is not available. In some embodiments, the mobile terminal may only detect whether the first communication sublink is available, or may only detect whether the second communication sublink is available, or the mobile terminal may detect whether the first communication sublink is available and whether the second communication sublink is available.

When the first communication link is established by using the direct connection way, the mobile terminal may send a third testing signal to the target equipment through the first communication link, and determine whether the first communication link is available based on whether a response corresponding to the third testing signal fed back by the target equipment is received.

If the mobile terminal detects that the first communication link is not available, a following step 603 can be performed. If the mobile terminal detects that the first communication link is available, a following step 604 can be performed.

In step 603, the mobile terminal generates a prompting message configured to prompt a user to repair the first communication link.

If the mobile terminal establishes the first communication link with the target equipment via the remote controller, and if the first communication sublink in the first communication link is not available, the mobile terminal may generate a prompting message prompting a user to repair the first communication sublink. If the second communication sublink in the first communication link is not available, the mobile terminal may generate a prompting message prompting a user to repair the second communication sublink. By the above method, the mobile terminal may accurately alert the user about the communication link where a fault occurs, so that the user may locate and repair the fault more efficiently.

When the first communication link is established by using the direct connection method, and if the first communication link is not available, the mobile terminal may generate a prompting message prompting a user to repair the first communication link.

In step 604, the mobile terminal sends the network configuration parameter of the repeater to the remote controller through a first communication sublink established between the mobile terminal and the remote controller.

Correspondingly, the remote controller may receive the network configuration parameter of the repeater from the mobile terminal through a first communication sublink established between the remote controller and the mobile terminal.

In step 605, the remote controller forwards the network configuration parameter of the repeater to the target equipment through the second communication sublink.

Correspondingly, the target equipment may receive the network configuration parameter of the repeater from the remote controller through the second communication sublink.

The step 604 and step 605 are examples where the mobile terminal establishes the first communication link with the target equipment via the remote controller and the remote controller forwards the network configuration parameter of the repeater. In some other embodiments, the remote controller may be replaced by other types of transit equipment. Alternatively, when the first communication link is established by using the direct connection way, the mobile terminal may directly send the network configuration parameter of the repeater to the target equipment through the first communication link.

Furthermore, in one embodiment, because the network configuration parameter of the repeater is generated by the mobile terminal, the mobile terminal may further need to provide the network configuration parameter to the repeater. In one embodiment, the remote controller may further forward the network configuration parameter to the repeater after receiving the network configuration parameter of the repeater. The wired connection (for example, serial port connection), or the wireless connection may be used between the remote controller and the repeater. In another embodiment, the mobile terminal may send the network configuration parameter to the repeater through the second wireless network connection established between the mobile terminal and the repeater.

In step 606, the target equipment generates a connection establishing request carrying with the network configuration parameter of the repeater.

In step 607, the target equipment broadcasts the connection establishing request.

The target equipment may generate and broadcast the connection establishing request after receiving the network configuration parameter of the repeater. The connection establishing request may carry the network configuration parameter of the repeater.

In step 608, the repeater acquires the connection establishing request sent by target equipment.

In step 609, the repeater detects whether the network configuration parameter carried in the connection establishing request is correct.

In step 610, if the network configuration parameter carried in the connection establishing request is correct, a first wireless network connection is established between the repeater and the target equipment.

The repeater may detect whether the network configuration parameter carried in the connection establishing request is correct after monitoring and acquiring the connection establishing request broadcast by the target equipment. When the detecting result is correct, the first wireless network connection can be established with the target equipment.

Furthermore, for data security or due to network conflict, the network configuration parameter of the repeater can be modified according to a user requirement, to improve data security or avoid network conflict. For example, if the target equipment is a drone, and if the connection of the repeater is not encrypted or the password is too simple, mobile terminals of other users may be able to access the repeater and acquire the data (such as images) transmitted back by the drone. Further, when drones are flying in a certain area, and if SSIDs of two repeaters are the same, the drones and the mobile terminal may not accurately distinguish the repeater to be connected. Therefore, in order to avoid the above problem, the network configuration parameter of the repeater may be modified according to actual situations. After generating the updated network configuration parameter of the repeater, the mobile terminal may use the methods described above to provide the updated network configuration parameter to the target equipment and the repeater, such that the target equipment reestablishes the first wireless network connection with the repeater by using the updated network configuration parameter. By the above methods, automatically updating of the network configuration parameter of the repeater can be achieved anytime and anywhere to improve data security or avoid network conflict, without affecting the flight of the target equipment.

In some embodiments, the mobile terminal acquires a network configuration parameter of a repeater and then sends the network configuration parameter to target equipment through a first communication link established between the mobile terminal and the target equipment, such that the target equipment establishes a first wireless network connection with the repeater by using the network configuration parameter. As described, providing the network configuration parameter by using the existing first communication link between the mobile terminal and the target equipment can be accomplished without user intervention, simplifying the operation and improving the efficiency.

Furthermore, the mobile terminal may automatically generate the network configuration parameter of the repeater and send the network configuration parameter to the target equipment via the remote controller, and the existing communication link in the whole system can be fully used. Further, automatically updating the network configuration parameter of the repeater can be achieved anytime and anywhere to improve data security or avoid network conflict, without affecting normal flight of the target equipment.

Furthermore, before sending the network configuration parameter of the repeater to the target equipment through the first communication link, the mobile terminal can detect whether the first communication link is available, to ensure that the network configuration parameter of the repeater is successfully sent to the target equipment subsequently.

The mobile terminal may automatically generate the network configuration parameter of the repeater. In some other embodiments, the network configuration parameter may also be automatically generated by the repeater. Correspondingly, the mobile terminal may receive the network configuration parameter automatically generated by the repeater from the repeater through the second wireless network connection. The mobile terminal may send the network configuration parameter of the repeater to the target equipment through the first communication link. In another embodiment, the repeater may establish communication connection with the remote controller by methods such as using a serial port. After generating the network configuration parameter of the repeater, the repeater may directly send the network configuration parameter to the remote controller, and the remote controller may forward the network configuration parameter to the target equipment. In some other embodiments, the mobile terminal may also display a configuration interface of the network configuration parameter of the repeater, and acquire the network configuration parameter in the configuration interface input and configured by the user.

In the FIG. 6, the steps related to the mobile terminal side may be separately implemented as a method for establishing a wireless network connection at the mobile terminal side, the steps related to the target equipment side may be separately implemented as a method for establishing a wireless network connection at the target equipment side, the steps related to the repeater side may be separately implemented as a method for establishing a wireless network connection at the repeater side, and the steps related to the remote controller side may be separately implemented as a method for establishing a wireless network connection at the remote controller side.

Furthermore, in one embodiment, the target equipment may be the external equipment of the drone. When the target equipment is the external equipment of the drone, the external equipment of the drone may be connected with a control component of the drone through a data bus. After receiving the network configuration parameter of the repeater from the remote controller, the control component of the drone may provide the network configuration parameter to the external equipment of the drone through the data bus; the external equipment of the drone may establish the first wireless network connection with the repeater by using the network configuration parameter. The external equipment of the drone may only include an image collecting component, or it may only include a flight parameter detecting component, or it may include both the image collecting component and flight parameter detecting component at the same time. In some other embodiments, the external equipment of the drone may be designed as other functional components according to actual requirement.

When the target equipment is the external equipment of the drone, before sending the network configuration parameter of the repeater to the target equipment through the first communication link, the mobile terminal may further detect the connection between the external equipment of the drone and the control component of the drone is available, to ensure that the network configuration parameter of the repeater is successfully sent to the external equipment of the drone subsequently. For example, the control component of the drone may detect whether the connection between the control component and the external equipment is available, and may feed the detecting result to the mobile terminal. If the mobile terminal receives a detecting result indicating that the above connection is not available, a prompting message prompting the user to repair the connection between the external equipment of the drone and the control component of the drone can be generated. If the mobile terminal receives a detecting result indicating that the above connection is available, and the first communication link between the mobile terminal and the control component of the drone is also available, the mobile terminal may send the network configuration parameter of the repeater to the control component of the drone through the first communication link, and the control component may provide the network configuration parameter to the external equipment of the drone through the data bus, such that the external equipment of the drone establishes the first wireless network connection with the repeater by using the network configuration parameter.

In the following embodiments, exemplary devices configured to perform the methods in the above embodiments are disclosed. Details of the devices may be referred to the embodiments of methods described above.

Figure 7A:
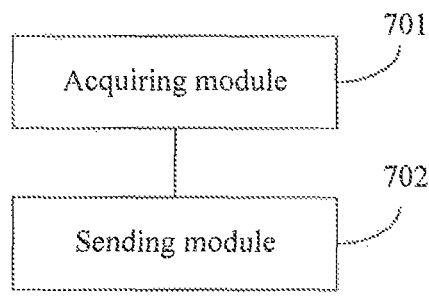
FIG. 7A is a block diagram illustrating a device for establishing a wireless network connection, according to an exemplary embodiment.

FIG. 7A is a block diagram illustrating a device for establishing a wireless network connection, according to an exemplary embodiment. The device may be a part of the mobile terminal or the entire mobile terminal. The device may be software, hardware, or a combination thereof. The device may include: an acquiring module 701 and a sending module 702.

The acquiring module 701 may be configured to acquire a network configuration parameter of a repeater.

The sending module 702 may be configured to send the network configuration parameter acquired by the acquiring module 701 to target equipment through a first communication link established between the mobile terminal and the target equipment, and the target equipment establishes a first wireless network connection with the repeater by using the network configuration parameter.

In some embodiments, the mobile terminal may acquire a network configuration parameter of a repeater and then send the network configuration parameter to target equipment through a first communication link established between the mobile terminal and the target equipment, such that the target equipment establishes a first wireless network connection with the repeater by using the network configuration parameter. As described, providing the network configuration parameter by using the existing first communication link between the mobile terminal and the target equipment can be accomplished without user intervention, simplifying the operation and improving the efficiency.

In one embodiment, the first communication link may include: a first communication sublink between the mobile terminal and a remote controller, and a second communication sublink between the remote controller and the target equipment.

The sending module 702 may be configured to send the network configuration parameter acquired by the acquiring module 701 to the remote controller through the first communication sublink.

The remote controller may be configured to forward the network configuration parameter to the target equipment through the second communication sublink.

For example, the first communication sublink may adopt a wired connection method; alternatively, the first communication sublink may adopt a wireless connection method.

In another embodiment, the acquiring module 701 may be further configured to: automatically generate the network configuration parameter of the repeater; or, receive the network configuration parameter automatically generated by the repeater from the repeater through the second wireless network connection established between the mobile terminal and the repeater.

Figure 7B:
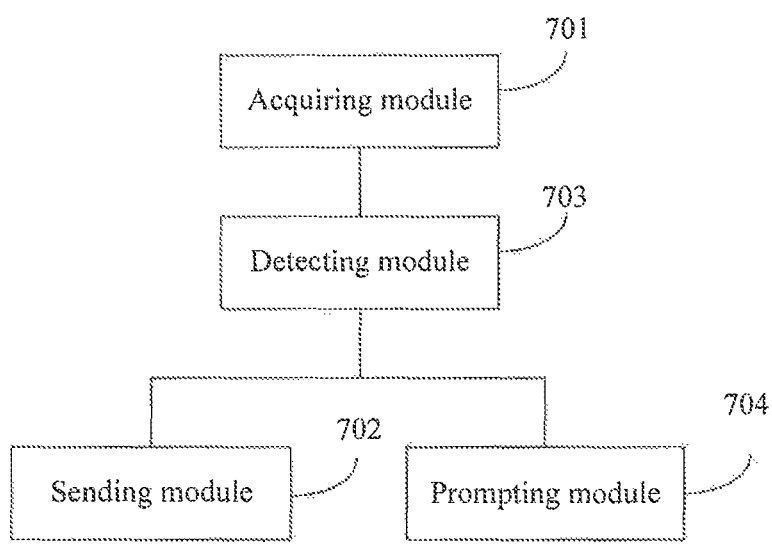
FIG. 7B is a block diagram illustrating a device for establishing a wireless network connection, according to another exemplary embodiment.

In another embodiment, as shown in FIG. 7B, the device may further include a detecting module 703 and a prompting module 704.

The detecting module 703 may be configured to detect whether the first communication link is available.

The sending module 702 may be configured to, if the detecting module 703 detects that the first communication link is available, send the network configuration parameter to target equipment through a first communication link established between the mobile terminal and the target equipment.

The prompting module 704 may be configured to, if the detecting module 703 detects that the first communication link is not available, generate a prompting message configured to prompt a user to repair the first communication link.

For example, the detecting module 703 may be configured to: detect whether the first communication sublink is available; and/or, receive an indicating message from the remote controller through the first communication sublink, the indicating message indicating whether the second communication sublink is available.

In another embodiment, the target equipment may be external equipment of a drone.

For example, the external equipment is connected with a control component of the drone through a data bus; the first communication link is established between the control component and the mobile terminal; and a second wireless network connection is further established between the repeater and the mobile terminal, and the first wireless network connection and the second wireless network connection form a second communication link between the external equipment and the mobile terminal.

For example, the external equipment includes: an image collecting component and/or a flight parameter detecting component.

Figure 8A:
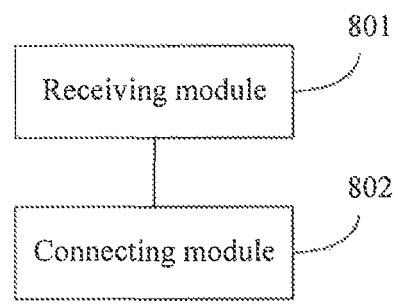
FIG. 8A is a block diagram illustrating a device for establishing a wireless network connection, according to another exemplary embodiment.

FIG. 8A is a block diagram illustrating a device for establishing a wireless network connection according to another exemplary embodiment. The device may be a part of the target equipment or the entire target equipment. The device may be software, hardware, or a combination thereof. The device may include: a receiving module 801 and a connecting module 802.

The receiving module 801 may be configured to receive a network configuration parameter of a repeater sent by a mobile terminal through a first communication link established between the target equipment and a mobile terminal.

The connecting module 802 may be configured to establish a first wireless network connection with the repeater by using the network configuration parameter received by the receiving module 801.

In some embodiments, the target equipment may receive a network configuration parameter of a repeater sent by a mobile terminal through a first communication link established between the target equipment and a mobile terminal; and then the target equipment establishes a first wireless network connection with the repeater by using the network configuration parameter. As described, providing the network configuration parameter by using the existing first communication link between the mobile terminal and the target equipment can be accomplished without user intervention, simplifying the operation and improving the efficiency.

In one embodiment, the first communication link may include: a first communication sublink between the mobile terminal and a remote controller, and a second communication sublink between the remote controller and the target equipment.

Correspondingly, the receiving module 801 may be further configured to: receive the network configuration parameter of the repeater from the remote controller through the second communication sublink. The mobile terminal may send the network configuration parameter to the remote controller through the first communication sublink.

Figure 8B:
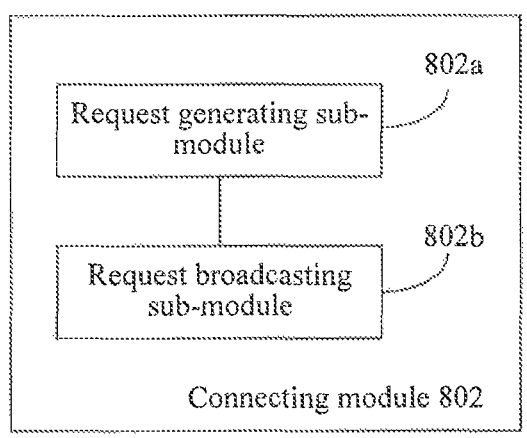
FIG. 8B is a block diagram illustrating a connecting module 802, according to another exemplary embodiment.

In one embodiment as shown in FIG. 8B, the connecting module 802 may include a request generating sub-module 802a and a request broadcasting sub-module 802b.

The request generating sub-module 802a may be configured to generate a connection establishing request carrying with the network configuration parameter received by the receiving module 801.

The request broadcasting sub-module 802b may be configured to broadcast the connection establishing request generated by the request generating sub-module 802a, such that after acquiring the connection establishing request, the repeater establishes the first wireless connection with the target equipment when it is detected that the network configuration parameter is correct.

Figure 9A:
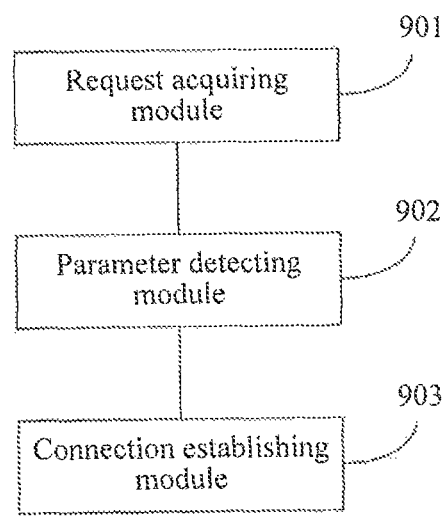
FIG. 9A is a block diagram illustrating a device for establishing a wireless network connection, according to another exemplary embodiment.

FIG. 9A is a block diagram illustrating a device for establishing a wireless network connection, according to another exemplary embodiment. The device may be a part of the repeater or the entire repeater. The device may be software hardware or a combination thereof. The device may include: a request acquiring module 901, a parameter detecting module 902, and a connection establishing module 903.

The request acquiring module 901 may be configured to acquire a connection establishing request sent by target equipment, the connection establishing request carrying a network configuration parameter of the repeater, received from the mobile terminal through a first communication link established between the target equipment and a mobile terminal.

The parameter detecting module 902 may be configured to detect whether the network configuration parameter acquired by the request acquiring module 901 is correct.

The connection establishing module 903 may be configured to, if the parameter detecting module 902 detects that the network configuration parameter is correct, establish a first wireless network connection with the target equipment.

In some embodiments, the repeater may acquire a connection establishing request sent by target equipment, and establish a first wireless network connection with the target equipment when it is detected that the network configuration parameter carried in the connection establishing request is correct. As described, providing the network configuration parameter by using the existing first communication link between the mobile terminal and the target equipment can be accomplished without user intervention, simplifying the operation and improving the efficiency.

Figure 9B:
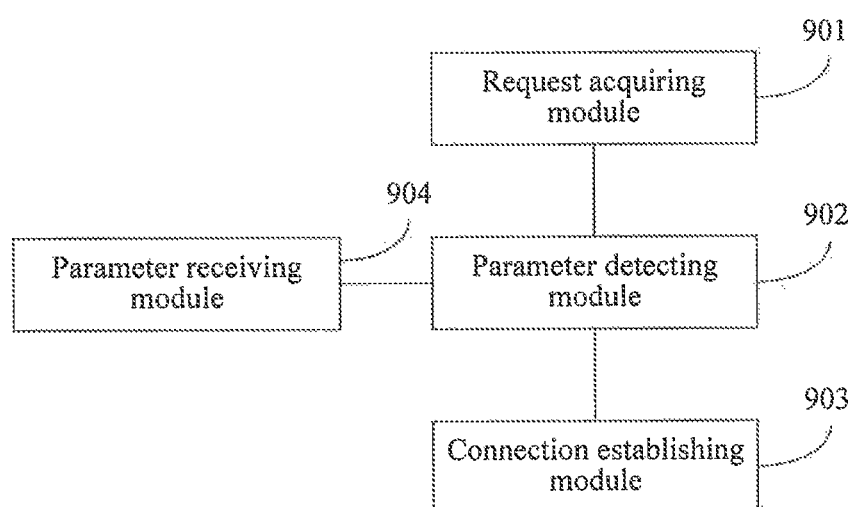
FIG. 9B is a block diagram illustrating a device for establishing a wireless network connection, according to another exemplary embodiment.
Figure 9C:
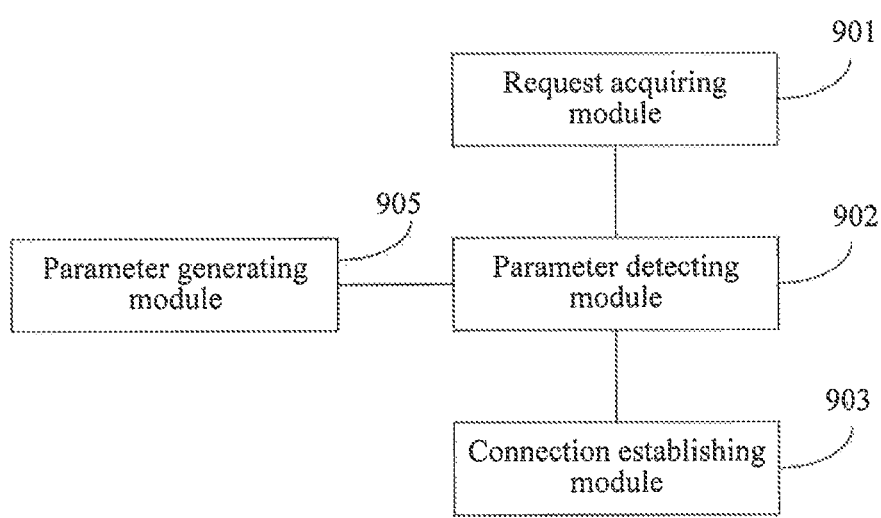
FIG. 9C is a block diagram illustrating a device for establishing a wireless network connection, according to another exemplary embodiment.

In one embodiment as shown in FIG. 9B or 9C, the device may further include: a parameter receiving module 904 or a parameter generating module 905.

The parameter receiving module 904 may be configured to receive the network configuration parameter of the repeater automatically generated by the mobile terminal from the mobile terminal through a second wireless network connection established between the repeater and the mobile terminal.

The parameter generating module 905 may be configured to automatically generate the network configuration parameter of the repeater.

Figure 10:
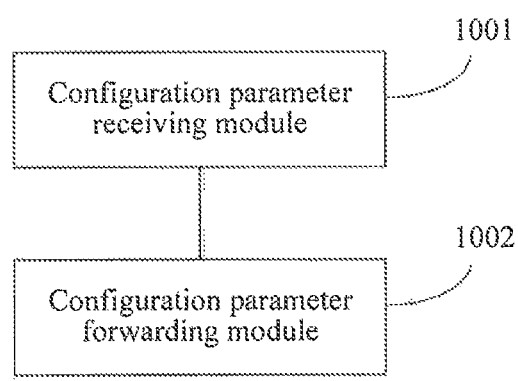
FIG. 10 is a block diagram illustrating a device for establishing a wireless network connection, according to another exemplary embodiment.

FIG. 10 is a block diagram illustrating a device for establishing a wireless network connection, according to another exemplary embodiment. The device may be a part of the remote controller or the entire remote controller. The device may be software, hardware or a combination thereof. The device may include: a configuration parameter receiving module 1001 and a configuration parameter forwarding module 1002.

The configuration parameter receiving module 1001 may be configured to receive the network configuration parameter of the repeater from the mobile terminal or the repeater.

The configuration parameter forwarding module 1002 may be configured to forward the network configuration parameter received by the configuration parameter receiving module 1001 to the target equipment, the target equipment establishing a first wireless network connection with the repeater by using the network configuration parameter.

In some embodiments, the remote controller receives a network configuration parameter from a mobile terminal or a repeater, and forwards the network configuration parameter to the target equipment, such that the target equipment establishes a first wireless network connection with the repeater by using the network configuration parameter. As described, providing the network configuration parameter by using the existing first communication link between the mobile terminal and the target equipment can be accomplished without user intervention, simplifying the operation and improving the efficiency.

The device described above is illustrated by exemplary functional modules. In practice, the above functions may be performed by different modules as desired, that is, the internal structure of the device may be divided into different functional modules, so as to achieve all or a part of the functions described above.

Figure 11:
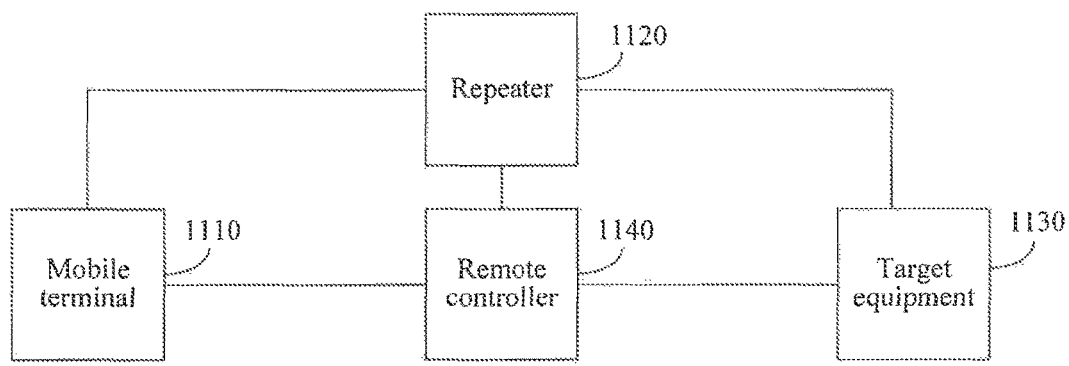
FIG. 11 is a block diagram illustrating a system for establishing a wireless network connection, according to an exemplary embodiment.

FIG. 11 is a block diagram illustrating a system for establishing a wireless network connection, according to an exemplary embodiment. The system may include: a mobile terminal 1110, a repeater 1120 and target equipment 1130.

The mobile terminal 1110 may be configured to acquire a network configuration parameter of a repeater 1120.

The mobile terminal 1110 may be further configured to send the network configuration parameter to the target equipment 1130 through a first communication link established between the mobile terminal 1110 and the target equipment 1130.

The target equipment 1130 may be further configured to establish a first wireless network connection with the repeater 1120 by using the network configuration parameter.

For example, as shown in FIG. 11, the system may further include: a remote controller 1140. Correspondingly, the first communication link may include: a first communication sublink between the mobile terminal 1110 and a remote controller 1140, and a second communication sublink between the remote controller 1140 and the target equipment 1130.

The mobile terminal 1110 may be configured to send the network configuration parameter to the remote controller 1140 through the first communication sublink.

The remote controller 1140 may be configured to forward the network configuration parameter to the target equipment 1130 through the second communication sublink.

One exemplary embodiment of the present disclosure may further provide a device for establishing a wireless network connection. The device may include a processor and a non-transitory computer-readable memory for storing instructions executable by the processor.

The processor may be configured to:

acquire a network configuration parameter of a repeater; and send the network configuration parameter to target equipment through a first communication link established between the mobile terminal and the target equipment, the target equipment establishing a first wireless network connection with the repeater by using the network configuration parameter.

For example, the first communication link may include: a first communication sublink between the mobile terminal and a remote controller, and a second communication sublink between the remote controller and the target equipment.

Correspondingly, the processor may be configured to: send the network configuration parameter to the remote controller through the first communication sublink.

The remote controller may be configured to forward the network configuration parameter to the target equipment through the second communication sublink.

For example, the first communication sublink may use a wired connection method; alternatively, the first communication sublink may use a wireless connection method.

For example, the processor may be configured to:

automatically generate the network configuration parameter of the repeater; or receive the network configuration parameter automatically generated by the repeater from the repeater through the second wireless network connection established between the mobile terminal and the repeater.

For example, the processor may be further configured to:

detect whether the first communication link is available;

if the first communication link is available, send the network configuration parameter to target equipment through a first communication link established between the mobile terminal and the target equipment; and if the first communication link is not available, generate a prompting message configured to prompt a user to repair the first communication link.

For example, the first communication link may include: a first communication sublink between the mobile terminal and a remote controller, and a second communication sublink between the remote controller and the target equipment. The processor may be configured to:

detect whether the first communication sublink is available; and/or, receive an indicating message from the remote controller through the first communication sublink, the indicating message indicating whether the second communication sublink is available.

For example, the target equipment is external equipment of a drone.

Correspondingly, the external equipment may be connected with a control component of the drone through a data bus; the first communication link may be established between the control component and the mobile terminal; and a second wireless network connection may be further established between the repeater and the mobile terminal, and the first wireless network connection and the second wireless network connection form a second communication link between the external equipment and the mobile terminal.

For example, the external equipment may include: an image collecting component and/or a flight parameter detecting component.

One exemplary embodiment discloses a device for establishing a wireless network connection. The device may include a processor and a non-transitory computer-readable memory for storing instructions executable by the processor.

The processor may be configured to: receive a network configuration parameter of a repeater sent by a mobile terminal through a first communication link established between the target equipment and a mobile terminal; and establish a first wireless network connection with the repeater by using the network configuration parameter.

For example, the first communication link may include: a first communication sublink between the mobile terminal and a remote controller, and a second communication sublink between the remote controller and the target equipment.

Correspondingly, the processor may be configured to: receive the network configuration parameter of the repeater from the remote controller through the second communication sublink.

The mobile terminal may send the network configuration parameter to the remote controller through the first communication sublink.

For example, the processor may be configured to: generate a connection establishing request carrying with the network configuration parameter; and broadcast the connection establishing request, such that after acquiring the connection establishing request, the repeater establishes the first wireless connection with the target equipment when it is detected that the network configuration parameter is correct.

One exemplary embodiment discloses a device for establishing a wireless network connection. The device may include a processor and a non-transitory computer-readable memory for storing instructions executable by the processor.

The processor may be configured to: acquire a connection establishing request sent by target equipment, the connection establishing request carrying a network configuration parameter of the repeater, received from the mobile terminal through a first communication link established between the target equipment and a mobile terminal; detect whether the network configuration parameter is correct; and if the network configuration parameter is correct, establish a first wireless network connection with the target equipment.

For example, the processor may be further configured to:

receive the network configuration parameter of the repeater automatically generated by the mobile terminal from the mobile terminal through a second wireless network connection established between the repeater and the mobile terminal;

or, automatically generate the network configuration parameter of the repeater.

One exemplary embodiment discloses a device for establishing a wireless network connection. The device includes a processor and a non-transitory computer-readable memory for storing instructions executable by the processor.

The processor may be configured to:

receive a network configuration parameter of a repeater from a mobile terminal or a repeater; and forward the network configuration parameter to the target equipment, wherein the target equipment establishes a first wireless network connection with the repeater by using the network configuration parameter.

Figure 12:
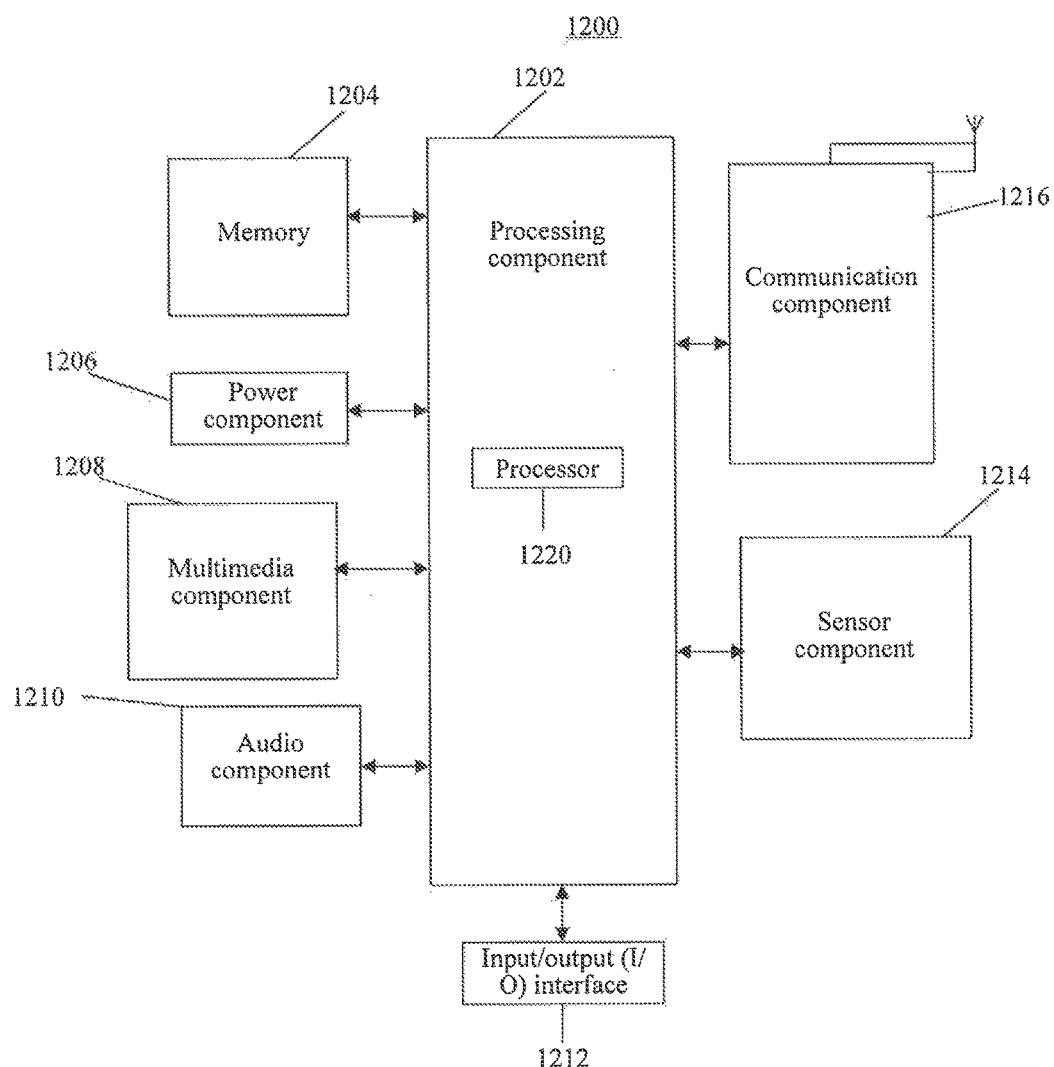
FIG. 12 is a block diagram illustrating a device for establishing a wireless network connection, according to an exemplary embodiment.

FIG. 12 is a block diagram illustrating a device 1200 according to an exemplary embodiment. The device 1200 may be the mobile terminal described above. For example, the device 1200 may be a mobile phone, a computer, a digital broadcast terminal, a messaging device, a gaming console, a tablet, a medical device, exercise equipment, a personal digital assistant, and the like.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 may control overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 may be configured to store various types of data to support the operation of the device 1200. Examples of such data include instructions for any applications or methods operated on the device 1200, contact data, phonebook data, messages, pictures, video, etc. The memory 1204 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk. The memory 1204 may be non-transitory and computer-readable.

The power component 1206 may provide power to various components of the device 1200. The power component 1206 may include a power management system, one or more power sources, and any other components associated with the generation, management, and distribution of power in the device 1200.

The multimedia component 1208 may include a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel may include one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 may include a front camera and/or a rear camera. The front camera and the rear camera may receive an external multimedia datum while the device 1200 is in an operation mode, such as a photographing mode or a video mode. Each of the front camera and the rear camera may be a fixed optical lens system or have focus and optical zoom capability.

The audio component 1210 may be configured to output and/or input audio signals. For example, the audio component 1210 may include a microphone ("MIC") configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 may further include a speaker to output audio signals.

The I/O interface 1212 may provide an interface between the processing component 1202 and peripheral interface modules, such as a keyboard, a click wheel, buttons, and the like. The buttons may include, but are not limited to, a home button, a volume button, a starting button, and a locking button.

The sensor component 1214 may include one or more sensors to provide status assessments of various aspects of the device 1200. For instance, the sensor component 1214 may detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of nearby objects without any physical contact. The sensor component 1214 may further include a light sensor, such as a CMOS or CCD image sensor, for use in imaging applications. In some embodiments, the sensor component 1214 may further include an accelerometer sensor, a gyroscope sensor, a magnetic sensor, a pressure sensor or a temperature sensor.

The communication component 1216 may be configured to facilitate communication, wired or wirelessly, between the device 1200 and other devices. The device 1200 may access a wireless network based on a communication standard, such as WiFi, 2G, or 3G, or a combination thereof. In one exemplary embodiment, the communication component 1216 may receive a broadcast signal or broadcast associated information from an external broadcast management system via a broadcast channel. In one exemplary embodiment, the communication component 1216 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method at the mobile terminal side in the embodiment as shown in FIG. 2 or FIG. 6.

In exemplary embodiments, a non-transitory computer-readable storage medium including instructions is disclosed, such as included in the memory 1204, executable by the processor 1220 in the device 1200, for performing the above described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adoptions of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A mobile terminal for establishing a wireless network connection, comprising:
    a processor; and
    a memory for storing instructions executable by the processor,
    wherein the processor is configured to:
    acquire a network configuration parameter of a repeater; and
    send the network configuration parameter to target equipment through a first communication link established between the mobile terminal and the target equipment, wherein the target equipment establishes a first wireless network connection with the repeater by using the network configuration parameter,
    wherein:
        the target equipment is external equipment of a drone;
        the external equipment is connected with a control component of the drone through a data bus;
        the first communication link is established between the control component and the mobile terminal; and
        a second wireless network connection is established between the repeater and the mobile terminal, the first wireless network connection and the second wireless network connection forming a second communication link between the external equipment and the mobile terminal, and
    wherein:
        the first communication link comprises a first communication sublink between the mobile terminal and a remote controller, and a second communication sublink between the remote controller and the target equipment; and
        the processor is further configured to send the network configuration parameter to the remote controller through the first communication sublink, and the remote controller is configured to forward the network configuration parameter to the target equipment through the second communication sublink.

2. The mobile terminal of claim 1, wherein the processor is further configured to:
    detect whether the first communication link is available;
    if the first communication link is available, send the network configuration parameter to target equipment through the first communication link established between the mobile terminal and the target equipment; and
    if the first communication link is not available, generate a prompting message prompting a user to repair the first communication link.

3. The mobile terminal of claim 2, wherein the processor is further configured to:
    detect whether the first communication sublink is available, and/or
    receive an indicating message from the remote controller through the first communication sublink, the indicating message indicating whether the second communication sublink is available.

4. The mobile terminal of claim 1, wherein the external equipment comprises:
    at least one of an image collecting component or a flight parameter detecting component.

5. A device for establishing a wireless network connection, comprising:
    a processor; and
    a memory for storing instructions executable by the processor,
    wherein the processor is configured to:
        receive a network configuration parameter of a repeater sent by a mobile terminal through a first communication link established between the device and the mobile terminal; and
        establish a first wireless network connection with the repeater by using the network configuration parameter,
    wherein:
        the device is external equipment of a drone;
        the external equipment is connected with a control component of the drone through a data bus;
        the first communication link is established between the control component and the mobile terminal; and
        a second wireless network connection is established between the repeater and the mobile terminal, the first wireless network connection and the second wireless network connection forming a second communication link between the external equipment and the mobile terminal, and
    wherein:
        the first communication link comprises a first communication sublink between the mobile terminal and a remote controller, and a second communication sublink between the remote controller and the device; and
        the processor is further configured to: receive the network configuration parameter of the repeater from the remote controller through the second communication sublink, wherein the mobile terminal sends the network configuration parameter to the remote controller through the first communication sublink.

6. The device of claim 5, wherein the processor is further configured to:
    generate a connection establishing request carrying with the network configuration parameter; and
    broadcast the connection establishing request.

7. The device of claim 5, wherein the processor is further configured to:
   generate a connection establishing request carrying with the network configuration parameter; and
   broadcast the connection establishing request.

\* \* \* \* \*